(12) United States Patent
Miklos et al.

(10) Patent No.: US 7,189,941 B2
(45) Date of Patent: Mar. 13, 2007

(54) PROCESS FOR MAKING HETEROGENEOUS JOINTS UNDER SHIELDING GAS

(75) Inventors: Ernst Miklos, Tutzing (DE); Friedrich Tischler, Lambach (AT)

(73) Assignee: Linde Aktiengesellschaft, Wiesbaden (DE)

( * ) Notice: Subject to any disclaimer, the term of this patent is extended or adjusted under 35 U.S.C. 154(b) by 57 days.

(21) Appl. No.: 10/324,139

(22) Filed: Dec. 20, 2002

(65) Prior Publication Data

US 2003/0136765 A1    Jul. 24, 2003

(30) Foreign Application Priority Data

Dec. 20, 2001    (DE)    ............... 101 62 937

(51) Int. Cl.
    *B23K 33/00*    (2006.01)
(52) U.S. Cl. ............... 219/137 WM; 219/74; 219/137 R
(58) Field of Classification Search ............ 219/74, 219/137 WM, 137 R
    See application file for complete search history.

(56) References Cited

U.S. PATENT DOCUMENTS

| | | | | |
|---|---|---|---|---|
| 3,341,680 A | * | 9/1967 | Rjabov et al. | 219/73 |
| 4,407,441 A | * | 10/1983 | Aarts | 228/176 |
| 4,463,243 A | * | 7/1984 | Church | 219/74 |
| 5,083,002 A | * | 1/1992 | Hoback et al. | 219/74 |
| 5,558,791 A | | 9/1996 | Fawer | |
| 6,111,218 A | * | 8/2000 | Matile et al. | 219/137 PS |
| 6,603,092 B2 | * | 8/2003 | Briand et al. | 219/121.64 |
| 6,624,387 B1 | * | 9/2003 | Tischler | 219/129 |
| 6,683,268 B2 | * | 1/2004 | Briand et al. | 219/61 |

FOREIGN PATENT DOCUMENTS

| | | | |
|---|---|---|---|
| DE | 4138835 | * | 5/1993 |
| DE | 4327672 | * | 12/1994 |
| DE | 4327671 | * | 2/1995 |
| DE | 19748351 | * | 5/1999 |
| EP | 0 639 423 | | 2/1995 |
| EP | 1 101 599 A1 | | 5/2001 |
| GB | 999350 | | 7/1965 |
| GB | 1378091 | | 12/1974 |
| WO | WO 94/07642 | | 4/1994 |
| WO | WO 94/13428 | | 6/1994 |
| WO | WO 00/24545 | | 5/2000 |

OTHER PUBLICATIONS

International Search Report dated May 26, 2004.

* cited by examiner

*Primary Examiner*—Len Tran
(74) *Attorney, Agent, or Firm*—Millen, White, Zelano, Branigan, P.C.

(57) ABSTRACT

In joining heterogeneous materials that differ in their melting points, a shielding gas mixture with active gas content is utilized. In particular, the shielding gas mixture contains helium and active gasses in the vpm range (0.005 to 0.5% by volume). These shielding gases to lead to the production of high quality joints when joining aluminum and steel.

22 Claims, No Drawings

PROCESS FOR MAKING HETEROGENEOUS JOINTS UNDER SHIELDING GAS

The invention relates to a process for making heterogeneous joints made of two different materials with an arc or a laser beam under shielding gas, in which only one of the two materials is melted, and a shielding gas used for this purpose.

In industrial application, welding has been long established for joining metallic workpieces. In welding, the workpieces to be joined are melted. In welding materials under a shielding gas, an arc burns in an envelope of shielding gas. Included in arc welding with a consumable electrode are metal inert gas welding (MIG welding or a GMA welding), and metal active gas welding (MAG welding or GMA welding). Arc welding with a non-consumable electrode includes, tungsten inert gas welding (TIG welding or GTA welding). Tungsten plasma welding (WP welding) represents an additional process variant of arc welding under shielding gas with a non-consumable electrode. Further, hybrid processes are known. The equipment and devices needed for welding are well known in circles of those skilled in the art. Shielding gas mixtures for welding with arcs exist in numerous different mixtures and the individual mixtures are optimized for the respective welding process and the material. Here attention is paid to a stable arc, a high quality welding seam, avoiding pores and weld spatter, and a high working speed.

Despite the wealth of developed and available welding processes and variants thereof, there are often problems with arc welding that are attributable to the high temperatures that are reached during welding. These high temperatures are necessary since the workpiece to be worked must be melted. Thus, the welding of zinc-coated, aluminum-coated, or otherwise-coated workpieces entails problems since, when joining zinc-coated plates, gasses are produced because of zinc's low vaporization point that lead to arc instabilities and are responsible for pores and weld spatter. Therefore, brazing is used as an efficient and also economical alternative to conventional welding techniques.

A thermal process for the integral joining of workpieces is designated as brazing, where a liquid phase is produced by melting a brazing filler metal. In contrast to welding, in brazing the solidus temperature of the workpieces to be joined is not reached. In this regard we can name the various arc brazing processes MIG, MAG, TIG as well as plasma and plasma-MIG brazing and hybrid brazing processes. In brazing processes, which work with an arc and under shielding gas, the brazing connection is produced using shielding gas welding devices. But, in doing so, the base material is not melted, but only the brazing filler metals. The brazing filler metals used have relatively low melting points on the order of about 1000° C. Bronze wires consisting of copper-based alloys with various alloy element such as, e.g., aluminum, silicon, or tin are often used as brazing filler metals.

To prevent arc instabilities that occur during arc-brazing with arcs and to eliminate the resulting quality degradations, EP 1 101 599 proposes an active gas component in the shielding gas. Using this shielding gas mixture, which consists of inert gasses with carbon dioxide or oxygen present in the vpm range (range below 1% by volume), high quality brazing joints are achieved with metallic workpieces. This is also true for nonferrous metals and for coated workpieces.

With the help of brazing, joints made of various heterogeneous materials can also be produced, and the above-mentioned advantages of brazing apply here also. It should be noted here that only the filler material—i.e., the brazing filler metal—is melted, and not the heterogeneous materials. In contrast, melting (to the extent this is even possible because of the varying melting points of the materials) both materials and the filler material results in a common melt bath and the joint is produced by welding and not by brazing. But, with different materials another process is still possible. Since the energy supply can be selected so that only one of the two workpieces and the filler material (to the extent that a filler material is used, which is usual) melts, while the second workpieces is only warmed but not melted, the joining process involves a mixed type of welding and brazing. This mixed type, in which the melt bath is formed from the material with lower melting point and solder filler material, and the material with the higher melting point is only warmed up but not melted, is possible only when making heterogeneous joints, since of course both workpieces must have different melting temperatures. The joints thus produced consequently have a dual nature of welding and brazing. The joining is performed with processes known from arc welding, such as TIG or MAG.

But, in making heterogeneous joints, certain problems arise since the process itself and both different materials require different shielding gasses and also the brazing filler material has special requirements. The shielding gas must guarantee a stable joining process and in doing so be adapted to the properties of each different type of components being joined. The requirements of both materials here can be completely opposite. But, despite this, the joint must be of high quality and in particular the occurrence of pores must be prevented. A spattering of the brazing filler metals and the material of the workpiece must also be avoided.

Thus, an object of the invention is to provide a process and a shielding gas that make it possible to join workpieces made of different types of materials. The materials differ with respect to their melting point temperatures so that the joining is a hybrid of welding and brazing.

Upon further study of the specification and appended claims, further objects and advantages of this invention will become apparent to those skilled in the art.

These objects are achieved in that the shielding gas contains at least one active gas component. The arc is stabilized by the use of an active gas component. A stable arc is indispensable to providing high quality joint seams, since a turbulent process leads to pores in the joint and the joint seam becomes of lower quality. An active gas component prevents the instabilities that arise due to the melting of the one material. $O_2$, $CO_2$, NO, $N_2O$, $N_2$, $H_2$, CO and $SF_6$ are suited here as the active gas. The amount of active gas component in the shielding gas must be selected to be at least high enough so that the stability of the arc is guaranteed. On the other hand, the volume content of the active gas component can not be too high because the active gas should at most metallugically react only negligible with the materials to be joined, to insure that the quality of the joint is not impaired.

Especially advantageously the shielding gas consequently has an active gas content of 0.005 to 0.5% by volume (50 to 5000 vpm), preferably up to 0.1% by volume (1000 vpm). In this range it is ensured that, on the one hand, the metallurgical influences on the materials are very limited and, on the other hand, the arc is sufficiently stabilized. Further, the dripping behavior of the brazing filler metal is positively influenced.

In an especially advantageous configuration, aluminum and/or aluminum alloys are joined. With these materials, active gasses in the vpm-range lead to optically high-quality bonds and also material spatter is effectively suppressed. Further, aluminum and its alloys are outstandingly suited for joining since, in comparison to other metals, they have a very low melting point. In joints with other metals that melt at higher temperatures, they represent the partnered component that melts during joining. But, because the amount of the active gas is in the vpm range, the metallurgical reactions of aluminum/aluminum alloys, especially oxidation, with the active gas are negligible.

Especially advantageously, steel or coated steel is joined. Since with steel the arc can be kept stable only by adding an active gas, the addition according to the invention is indispensable for achieving high quality joint seams. Steel, coated or uncoated, melts at relatively high temperatures and is the partnered component that only warms up but does not melt during joining.

The description below shows the particular advantages of the process according to the invention in joining aluminum or aluminum alloys with steel or coated steel.

In the process according to the invention one of the gasses $O_2$, $CO_2$, NO, $N_2O$ or $N_2$, or any mixture thereof is preferably used as the active gas component of the shielding gas. These gasses are outstandingly suited as the active gas because of their oxygen or nitrogen content.

For example, 0.01 to 0.07% by volume (100 to 700 vpm) of oxygen in the shielding gas has proven to be very advantageous.

In a further development of the invention, the shielding gas contains between 5 and 50% by volume, preferably between 10 and 30% by volume, of helium. The helium content improves the wetting behavior of the liquid brazing filler metal because it raises the temperature on the surface. Further, the helium content leads to an improvement when the melt is degassing since it provides for an effective transfer of heat from the arc to the melt. Also, a reaction of the helium with the brazing filler metal or the material of the workpiece does not occur, since helium is inert.

In another embodiment of the invention, the shielding gas contains argon. Argon, as an economical inert gas, effectively protects the joining procedure from the environment.

The shielding gas according to the invention comprises argon and/or helium and 0.005 to 0.5% by volume (50 to 5000 vpm), preferably up to 0.1% by volume (1000 vpm) of active gas. The inert gas protects the joint connection from the atmosphere and the active gas advantageously influences the process. The content in the vpm range assures, on the one hand, the stability of the arc and, on the other hand, metallurgical reactions are largely suppressed.

In an advantageous configuration, the shielding gas contains one of the gasses or a mixture of the gasses from among $O_2$, $CO_2$, NO, $N_2O$ or $N_2$ as the active gas.

With the particular, above-mentioned advantages, the shielding gas contains between 5 and 50% by volume, preferably between 10 and 30% by volume, of helium.

Preferably, the shielding gas consists of: argon, $O_2$ and optionally 5 and 50% by volume helium; argon, $CO_2$ optionally 5 and 50% by volume helium; argon, NO and optionally 5 and 50% by volume helium; argon, $N_2O$ and optionally 5 and 50% by volume helium; argon, $N_2$ and optionally 5 and 50% by volume helium; or argon, a mixture of two or more of among $O_2$, $CO_2$, NO, $N_2O$ and $N_2$, and optionally 5 and 50% by volume helium.

A shielding gas containing 0.01 to 0.07% by volume (100 to 700 vpm) of oxygen has proven to be especially advantageous as a shielding gas with an active gas for use in accordance with the invention for making heterogeneous joints.

In the foregoing and in the following examples, all temperatures are set forth uncorrected in degrees Celsius; and, unless otherwise indicated, all parts and percentages are by volume.

The entire disclosure of all applications, patents and publications, cited above and below, and of corresponding German Application No. 101 62 937.0, filed Dec. 20, 2001 is hereby incorporated by reference.

EXAMPLES

In example 1, a shielding gas consisting of 30% by volume of helium with 500 vpm (0.05% by volume) of oxygen and argon in the remaining volume is used for arc joining of a plate made of aluminum with a zinc-coated steel plate. A bronze wire with aluminum content is used as the brazing filler material. The joining procedure is performed according to the TIG or MIG process. The seam has no pores and is optically excellent. Even on the aluminum side, the connection shows no evidence of oxidation and is of high quality.

To join a workpiece made of aluminum with a second made of steel, according to example 2 a shielding gas of 1000 vpm (0.1% by volume) of $N_2O$ and 15% by volume of helium and argon is used and an aluminum-bronze as the brazing filler material. During joining, the aluminum and the solder melt, while the steel is only warmed up. A very stable arc is present here. The connection has no pores and is of high quality. There are no signs of metallurgical influences.

Example 3 describes the joining of an aluminum alloy with steel. The joining is performed according to the TIG process. In this case, the steel is warmed up and the aluminum alloy melts. The brazing filler metal too, a bronze, melts. A mixture of 30% by volume of helium, 100 vpm (0.01% by volume) of NO and argon is used as the shielding gas. The heterogeneous connection made this way is of high quality.

A plate made of a copper alloy is joined with an organically coated, zinc-coated steel plate in example 4. For this, the plasma MIG process, a hybrid process, is used. A mixture of 10% by volume of helium, 5000 vpm (0.5% by volume) of $CO_2$, and the balance being argon is used as the shielding gas. A bronze wire with silicon content is used as the brazing filler material. A nearly pore-free connection seam results. With the process according to the invention it thus becomes possible to produce high quality connections between heterogeneous materials.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A process comprising:
   making a heterogeneous joint made of two different materials with an arc under shielding gas, wherein only one of said two materials melts, wherein one of said two different materials is aluminum or an aluminum alloy and the other is steel or coated steel, wherein said shielding gas contains argon, 5–50% by volume of helium, and at least one active gas component, and wherein said shielding gas has an active gas content is 0.005 to 0.1% by volume.

2. A process according to claim 1, wherein the shielding gas consists of argon, 5–50% by volume of helium, and 0.005 to 0.1% by volume of said at least one active gas component.

3. A process according to claim 1, wherein said at least one active gas is $O_2$, $CO_2$, NO, $N_2O$, $N_2$ or any combination thereof.

4. A process comprising:

making a heterogeneous joint made of two different materials with an arc under shielding gas, wherein only one of said two materials melts, wherein one of said two different materials is aluminum or an aluminum alloy and the other is steel or coated steel, wherein said shielding gas contains argon, 5–50% by volume of helium, and at least one active gas component, wherein said shielding gas has an active gas content is 0.005 to 0.1% by volume, and wherein said at least one active gas is $O_2$ and said shielding gas has an $O_2$ content of 0.01 to 0.07% by volume.

5. A process according to claim 1, wherein the shielding gas contains 10–30% by volume of helium.

6. A process according to claim 1, wherein said at least one active gas is $H_2$, CO or $SF_6$.

7. A process according to claim 1, wherein said shielding gas consists of:

argon, $O_2$ and 5 and 50% by volume helium;
argon, $CO_2$ and 5 and 50% by volume helium;
argon, NO and 5 and 50% by volume helium;
argon, $N_2O$ and 5 and 50% by volume helium;
argon, $N_2$ and 5 and 50% by volume helium; or
argon, a mixture of two or more of $O_2$, $CO_2$, NO, $N_2O$ and $N_2$, and 5 and 50% by volume helium.

8. A process according to claim 1, wherein the shielding gas contains 15–30% by volume of helium.

9. A process according to claim 1, wherein said shielding gas comprises argon, 0.005 to 0.1% $O_2$ and 5 and 50% by volume helium.

10. A process according to claim 1, wherein said shielding gas comprises argon, 0.005 to 0.1% $CO_2$ and 5 and 50% by volume helium.

11. A process according to claim 1, wherein said shielding gas comprises argon, 0.005 to 0.1% NO and 5 and 50% by volume helium.

12. A process according to claim 1, wherein said shielding gas comprises argon, 0.005 to 0.1% $N_2O$ and 5 and 50% by volume helium.

13. A process according to claim 1, wherein said shielding gas comprises argon, 0.005 to 0.1% N2 and 5 and 50% by volume helium.

14. A process according to claim 1, wherein said shielding gas comprises argon, 0.005 to 0.1% of a mixture of two or more of $O_2$, $CO_2$, NO, $N_2O$ and $N_2$, and 5 and 50% by volume helium.

15. A process according to claim 1, wherein said at least one active gas is $O_2$.

16. A process according to claim 1, wherein said at least one active gas is NO.

17. A process according to claim 1, wherein said at least one active gas is $N_2O$.

18. A process according to claim 1, wherein said at least one active gas is $N_2$.

19. A process according to claim 1, wherein said at least one active gas is $O_2$, $CO_2$, NO, $N_2O$, $N_2$, $H_2$, CO, or $SF_6$.

20. A process according to claim 1, wherein said at least one active gas is $H_2$.

21. A process according to claim 1, wherein said at least one active gas is CO.

22. A process according to claim 1, wherein said at least one active gas is $SF_6$.

* * * * *